United States Patent [19]

Chrysostome et al.

[11] Patent Number: 4,544,020

[45] Date of Patent: Oct. 1, 1985

[54] METHOD OF REGULATING THE HEAT TRANSFER COEFFICIENT OF A HEAT EXCHANGER AND IMPROVED HEAT EXCHANGER FOR PRACTICING SAID METHOD

[75] Inventors: Gérard Chrysostome, le Creusot; Daniel Borgnat, Montchanin, both of France

[73] Assignee: Creusot-Loire, Paris, France

[21] Appl. No.: 497,483

[22] Filed: May 23, 1983

[30] Foreign Application Priority Data

May 26, 1982 [FR] France .................... 82 09188

[51] Int. Cl.[4] .............................. F28C 3/16
[52] U.S. Cl. .............................. 165/1; 34/10; 34/54; 34/57 A; 165/104.16; 165/96; 122/4 D; 422/145; 422/146; 422/147
[58] Field of Search .............. 165/104.16, 96; 122/4 D; 34/57 A, 54, 10; 422/145, 146, 147

[56] References Cited

U.S. PATENT DOCUMENTS

| | | | |
|---|---|---|---|
| 3,565,022 | 2/1971 | Bishop ...................... | 122/4 D |
| 4,313,398 | 2/1982 | Ostendorf ................. | 165/104.16 |
| 4,353,812 | 10/1982 | Lomas et al. ............. | 165/104.18 |

FOREIGN PATENT DOCUMENTS

| | | | |
|---|---|---|---|
| 2152401 | 4/1972 | Fed. Rep. of Germany ................. | 165/104.16 |
| 18501 | 2/1977 | Japan ...................... | 122/4 D |
| 127902 | 11/1978 | Japan ...................... | 165/104.16 |
| 16002 | 2/1979 | Japan ...................... | 122/4 D |
| 74585 | 5/1982 | Japan ...................... | 165/104.16 |

*Primary Examiner*—Albert W. Davis, Jr.
*Attorney, Agent, or Firm*—Pollock, Vande Sande & Priddy

[57] ABSTRACT

Method and apparatus for regulating the heat transfer coefficient between a granular material and an exchange surface inside a heat exchanger in which a descending flow of a charge of material is arranged in the form of a mobile bed in contact with an elongated exchange member extending between lower and upper levels of the tank of the exchanger. The latter is provided with injection means for a gas into the charge of material. The flow conditions of the gas passing through the charge from below upwards are regulated so that the ascending flow speed is initially less than, at the base of the tank, the critical fluidization speed and then increases gradually to reach such critical speed at an adjustable level comprised between the lower and upper levels of the exchange member. The invention is especially applicable to heat exchangers used for cooling a granular material and/or for the heating of a heat transfer fluid.

4 Claims, 5 Drawing Figures

METHOD OF REGULATING THE HEAT TRANSFER COEFFICIENT OF A HEAT EXCHANGER AND IMPROVED HEAT EXCHANGER FOR PRACTICING SAID METHOD

FIELD OF THE INVENTION

The invention relates to a method of regulating the heat transfer coefficient caused to occur between a granular material and an exchange surface inside a heat exchanger and also covers the improved heat exchanger for applying the said method.

BACKGROUND OF THE INVENTION

Heat exchangers are known which are constituted by a tank with a vertical axis in which is arranged a descending flow of a charge of granular material between a feed opening and a discharge opening placed at its upper and lower ends, the charge constituting a mobile bed which moves from above downwards in contact with an elongated exchange member extending inside the tank between two levels, respectively below and above the latter. The exchange member may be immersed in the charge or may cover the inner wall of the tank and may be constituted, for example, by a tube or a bundle of tubes traversed by a heat transfer fluid.

To facilitate heat exchange, it has been proposed to inject at the base of the tank a gas distributed homogeneously inside the charge and which, even with a relatively small flow rate, forms an ascending current passing through the charge from below upwards and capable of fluidising the latter as soon as the speed of flow is sufficient. It is thus possible to considerably increase the heat transfer coefficient of the exchanger.

Generally, the heat exchange coefficient of such an exchanger is relatively constant and, to vary the power of the exchanger, the practice has developed, for example, of partitioning the fluidized bed into compartments whose number is adjusted according to the desired power. It is thus possible to vary the height of the charge or its speed of downward flow as well as the flow rate of the heat transfer fluid, but the adjustments are not instantaneous and can be made only in limited fashion. Now, in certain applications, it may be useful to vary very rapidly and to a relatively great extent, the heat exchange coefficient of the exchanger, for example to maintain the output temperature of the materials or the rise in temperature of the heat transfer fluid constant whatever the flow rate of the materials.

SUMMARY OF THE INVENTION

It is an object of the invention to provide a method of regulating the heat transfer and to provide an improved exchanger enabling this result to be achieved.

According to the invention, in a heat exchanger constituted by a tank containing a charge of granular material placed in contact with an exchange member and into which a gas is injected, the conditions of flow of the gas traversing the charge from below upwards are regulated so that the speed of ascending flow is initially less, at the base of the tank, than the critical speed of fluidization, and then increases progressively and reaches said critical speed at an adjustable level comprised between the lower and upper levels of the exchange member, the latter thus covering two superposed zones of the charge whose heights vary in reverse direction from one another, a dense lower zone with a low exchange coefficient and and upper fluidized zone with a high exchange coefficient, the regulation of the fluidization level permitting the overall exchange coefficient of the whole of the exchanger to be determined.

Preferably, the speed of ascending flow of the gas is regulated by varying the flow rate of the fluidization gas injected into the tank.

In the most general case where the granular material undergoes cooling between the upper and lower ends of the tank, the conditions of flow of the gas which circulates in counter current upwards are regulated so that the corresponding heating determines an increase in its speed of ascending flow, greater than the difference between the critical fluidization speed and the initial injection speed at the base of the exchanger, and this initial speed is selected so that, taking into account the increase undergone, the critical fluidization speed is reached at the desired level of the exchanger.

In a particular application of the method to an exchanger used for the cooling of a granular material, the temperature of the material is regulated at the outlet of the exchanger by variation of the fluidization level by modifying the flow rate of gas injected into the exchanger.

In another application of the method to an exchanger used for the heating of a heat transfer fluid flowing inside the exchange member, the outflow temperature of the heat transfer fluid is regulated by variation of the fluidization level, and consequently as regards the exchange surfaces immersed respectively in the dense part and in the fluidized part of the charge.

According to another aspect of the invention, there is provided a heat exchanger with a variable exchange coefficient comprising, for practise of the method, means for the progressive increase of the ascending flow speed of the injected gas, from the lower part to the upper part of the tank, from an initial speed less than the critical speed of fluidization, and means for regulating the initial speed at the base of the tank for controlling the level at which the critical speed of fluidization is reached.

In a preferred embodiment, the means of increasing the flow speed is constituted by a gradual narrowing of the passage cross-section of the gas from below upwards of the exchanger.

In another embodiment, the means for increasing the flow speed is constituted by a plurality of injection ramps distributed at different levels over the height of the tank, extending over the whole width of the latter, and provided with individual means of regulating the injected flow rates.

The invention will be better understood from the following description of an exemplary embodiment and of a particular application of the method and of the claimed device.

DETAILED DESCRIPTION OF PREFERRED EMBODIMENTS

Figure 1:
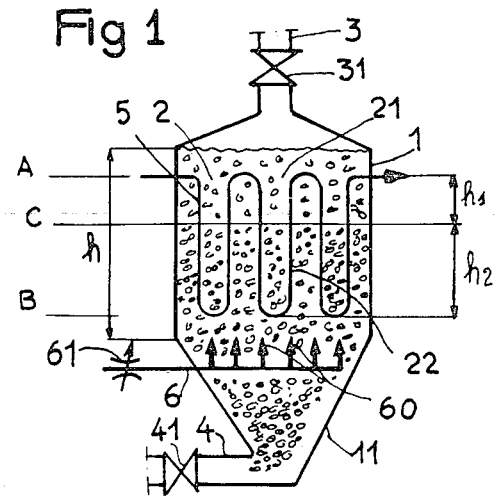
FIG. 1 is a diagrammatic view in elevation of an embodiment of a heat exchanger for practising the method according to the invention.

FIG. 1 shows diagrammatically a heat exchanger constituted by a vessel or tank 1 with a vertical axis filled with a charge 2 of granular material introduced through a feed pipe 3 opening at the upper part of the tank and discharged through an outlet pipe 4 into which opens the bottom 11 of the tank constituted normally in hopper form. The feed 3 and discharge 4 pipes are preferably provided with flow regulating member 31 and 41, which permit the height (h) of the charge occuring in the cylindrical portion 1 to be regulated.

Within this cylindrical portion is placed a heat exchange member with a large exchange surface, for example a bundle of tubes 5 traversed by a heat transfer fluid and extending between two levels respectively upper A and lower B.

Finally, at the lower part of the tank 1, beneath the cylindrical part, is placed at least one ramp 6 furnished with a plurality of nozzles for the upward injection of a gas which is distributed homogeneously into the charge of granular material and rises in the flow from below upwards through the latter. The ramp 6 is provided with a member 61 for regulating the flow rate of the injected gas. A homogeneous distribution of the gas over the whole width of the tank may by obtained in well known manner, by using a distribution grid.

The nature of the gas is chosen as a function of the requirements and this may be, for example, air, oxygen, steam, carbon dioxide or an inert gas.

In this manner there is arranged inside the tank 1 a mobile bed 2 which moves from above downwards in contact with the exchange member 5. Of course, in this case the heat exchange coefficient between the granular material 2 and the heat transfer fluid flowing in the tubes 5 is relatively low, and for this reason this coefficient is increased by injecting beneath the charge a gas at a sufficient speed to effect fluidization of the granular materiel.

In addition, the gas injected at the base of the tank and escaping through the feedpipe 3 or through a chimney flows in counter-current in the whole of the charge of granular material and hence exchanges calories with the latter.

Figure 2:
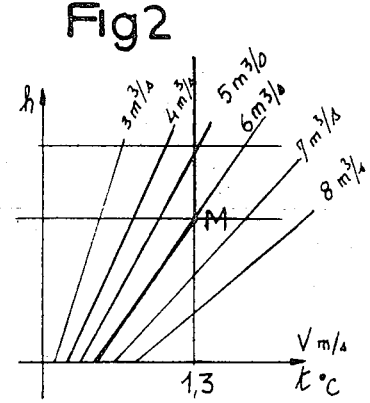
FIG. 2 is a diagram respresenting the operation of the exchanger of FIG. 1.

In the case where the charge 2 of granular material cools from above downwards in contact with the exchange member 5, even if the flow rate of injected gas in insufficient to give the latter an appreciable role in the cooling of the material, a rise in temperature of the gas which circulates in counter-current to the charge is observed. By way of example, FIG. 2 is a diagram representing the variations of the temperature (t) of the gas, indicated as abscissae, as a function of the height (h) indicated in ordinates. The rise in temperature being substantially proportional to the height, a more or less sloping line corresponds to each flow rate of gas injected at the base of the tank. Now, it is known that the specific volume of the gas is substantially proportional to the temperature. On the other hand, when the bed is dense, for a fairly homogeneous materiel, the passage cross-section of the gas depends on the cross-section of the exchanger, and when the latter is cylindrical it may be considered that the passage cross section is constant. Consequently, the rise in temperature undergone by the gas in the course of its ascent in the tank, and to which corresponds a corresponding increase in the specific volume, determines a continuous acceleration of its speed of rising flow. If the speed is indicated as abscissae, by judiciously selecting the scales, the variations in the speed of ascending flow as a function of height will be represented, in the diagram of FIG. 2, by the same lines each corresponding to an injection flow rate.

Besides, it is known that, for a given relatively homogeneous material, there exists a critical speed of fluidization below which the charge of material remains dense and above which the material is fluidized. For example, for a material such as ashy coal, the critical speed of fluidization is of the order of 1.3 m/s. In the diagram of FIG. 2, a straight line can be drawn which is parallel to the axis of the coordinates and has for abscissae the value 1.3. It is seen that for a gas flow rate of 5 m/s the gas has traversed the entire height of the charge without reaching the critical fluidization speed, the charge remaining in the form of a dense bed. On the other hand, for a flow rate of 6 m/s, the speed of the gas increases gradually to reach the critical speed of 1.3 m/s at a point M placed at the level C of the exchanger. The same is true of the temperature, which increases progressively up to point M. From level C, all the upper portion 21 of the charge, above height $h_1$, is fluidized, and it is known that, in this case, the material is at the same temperature over the entire fluidized height. Consequently, above the level C, the gas remains at the temperature reached at point M, and the same is true for the speed, which remains equal to the critical fluidization speed.

There are thus defined inside the charge and between the two levels A and B of the exchange member, two superposed zones, namely, a fluidized upper zone 21 comprised between the levels A and C of height, $H_1$ and a dense lower zone 22 comprised between the levels C and B and of height $h_2$. Now, the fluidization results in a very considerable variation of the heat exchange coefficient which may, for example, pass from 20 W/m2/°C. in a dense mobile bed to 200 W/m2/°C. in a fluidized bed. There have thus been formed inside the exchanger and over the height of the exchange member 5 two zones with very different exchange coefficients, and the relative heights of which can be varied in reverse direction by modifying the flow rate of gas injected through the ramp 6 beneath the exchange member 5. In fact, by increasing the injected gas flow rate, the initial ascending flow speed is increased which reaches more quickly the critical fluidization speed. On the other hand, as has been shown in FIG. 2, to a higher flow rate corresponds a greater increase in speed as the function of height, since, in the same passage cross section in the exchanger, the relative increase in volume which results from the same rise of temperature is applied to a greater volume of gas.

Thus, an exchanger is provided of which it is possible to vary substantially the global exchange coefficient.

For example, for a given flow rate of material in the tank, without modifying the flow rate of the heat transfer fluid in the tube system 5, it suffices to increase the flow rate of injected fluid by acting on the regulating member 61 to increase the height $h_1$ of the exchanger immersed in the fluidized zone 21, and consequently the amount of heat transferred from the charge to the heat transfer fluid. Hence it will be possible, without modifying the flow rates of the charge and of the heat transfer fluid, to keep constant the temperature of one of these two elements whatever the variations in temperature of the other by acting only on the injected fluid flow rate, the regulation of the cock 61 being for example servocoupled to the measurement of the temperature that it is desired to keep constant.

However, for a given fluid flow rate, an effect of self-regulation of the exchanger is also obtained.

In fact, the average temperature of the charge of material is substantially constant in the fluidized part, between the levels A and C, and varies rather little in the dense part, between the levels C and B, the heat exchange coefficient being small in this part. On the other hand, it may be assumed that, by reason of the rapidity of exchanges between the gas and the material, the temperature of the gas at each level is substantially equal to that of the particles occurring at the same level, and particularly at the level B at the base of the exchanger. The rise in temperature being proportional to the height, for a given flow rate of gas, the fluidization speed will be reached at a certain temperature which corresponds to the increase in speed enabling the critical fluidization speed to be reached, this temperature being the average temperature of all the fluidized part of the charge. Consequently, for a given gas flow rate, the fluidization is established at a certain level which determines the temperature of the fluidized part, and for a constant flow rate of gas, the fluidization level C remains stable. In fact, if, for one reason or another, the fluidized thickness $h_1$ increases, the exchange surface also increases and, the temperature dropping, the fluidization level has a tendency to rise to reduce the fluidized height.

On the other hand, if the flow rate or the temperature of the material at the inlet into the exchanger varies, the fluidization level will vary to adapt the exchange surface immersed in the fluidized part, the temperature remaining substantially constant.

The example which has just been described relates to the case was taken of an exchanger with a constant cross section in which cooling of the material is carried out and consequently heating of the gases which produces the increase in the speed of rising circulation. However, this increase in speed may also be obtained by other means.

Figure 3:
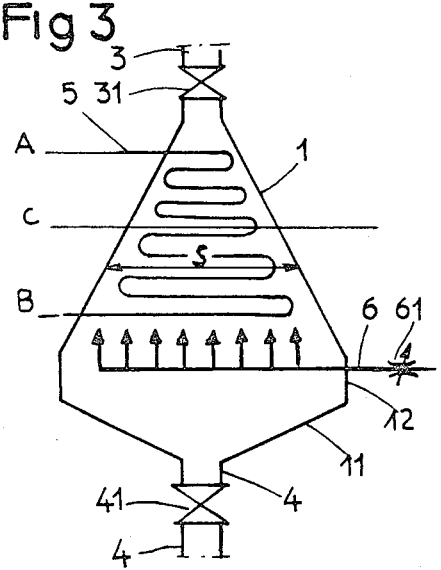
FIGS. 3 and 4 show diagrammatically two modifications of the exchanger.

In the embodiment of FIG. 3, the tank 1 of the exchanger is bounded by a wall in the form of a conical surface flared downwardly to a widened base 12 at the height of which are placed the gas injection ramp 6, the bottom 11 having as previously the shape of a hopper which opens into a discharge pipe 4.

The exchange member 5 between two levels A and B of this conical jacket.

The gas injected through the ramp 6 rises inside the tank 1 of which the passage cross section narrows gradually toward the top. As a result, there is, by purely mechanical means, an increase in the rising flow speed of the gas, and it is possible to determine the injection flow rate in the ramp 6 so that the initial flow speed at the level B is less than the critical fluidization speed and that the latter is reached at an intermediate level C whose position depends on the initial speed and consequently on the injected flow rate.

The increase in speed may arise only from the narrowing of the cross section and in this case, the shape of the tank and the initial speed of the gases will be determined so that the narrowing of the passage cross section determines a sufficient speed increase to reach the critical fluidization speed at the desired level. It will be possible to use such an embodiment in the case where the heat exchange between the granular material and the heat transfer fluid is not intended to produce cooling of the material. This will be the case, for example, when the exchanger is to be used for heating of the material or indeed for maintaining the latter at a constant temperature.

However, it is certainly possible to combine the features of FIGS. 1 and 3 by using an exchanger with an inverted conical wall for cooling the material flowing from below upwards. In fact, in this case, the effect of narrowing of the passage cross-section of the gases is added to that of the increase in temperature and hence increases the variation in the speed of rising flow of the gases from below upwards of the exchanger.

Figure 4:
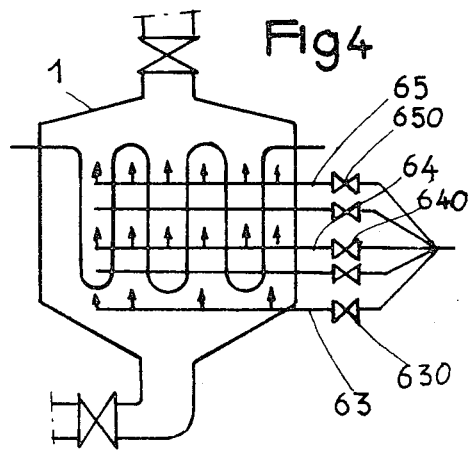

Another means of regulating the conditions of flow of the gases through the charge is shown in FIG. 4. In this case, within the tank 1 of the exchanger are placed a plurality of gas injection ramps 63, 64 and 65, spaced over the height of the exchanger. Each ramp is provided with a plurality of injection nozzles and extends over the entire width of the tank so as to ensure homogeneous distribution of the fluidization gas. In addition, each ramp is provided with an individual member 630, 640, 650, for regulation of the flow rate.

It is possible in a way to inject, for example through one of the ramps, a sufficient gas flow rate to cause the fluidization of the part of the charge occurring above this ramp, and consequently, by selecting the injection ramp, to regulate the level C from which fluidization is produced and the height $h_1$ of the exchange member immersed in the fluidized part.

It is also possible to use simultaneously several injection ramps and, by adding or cutting off ramps, to regulate the flow rate of the gases flowing from below upwards of the exchanger and select the level from which the injected flow rate permits fluidization of the part of the charge placed above the ramp in operation situated at the highest level.

In this case also, the arrangement of FIG. 4 may be combined with the features of FIGS. 1 and 3 since the speed increase resulting from the choice of the gas injection ramp may be increased by narrowing of the passage cross section of the gases and an increase in temperature of the latter.

Figure 5:
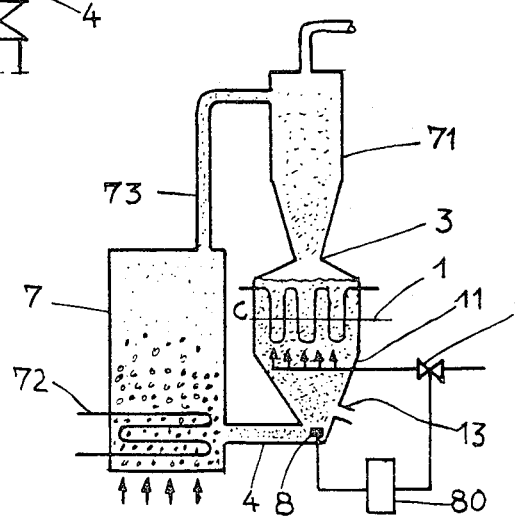
FIG. 5 illustrates a particular application of the method according to the invention.

The invention may be the subject of numerous uses. However, a particularly advantageous use has been shown in FIG. 5.

In this case, the exchanger 1 according to the invention serves for the cooling of a granular material coming from a fluidized bed formed in a vessel 7 connected by chimney to a separator 71 such as a cyclone whose lower part opens into the inlet orifice 3 of the exchanger 1, the outlet 4 from the latter returning the granular material back to the fluidized bed after cooling. Such an arrangement can serve, in particular, for controlling the temperature of the fluidized bed formed in the vessel 7, which may, for example, constitute a steam production boiler in a tube system 72 placed in the fluidized bed, or indeed a gasification reactor. In numerous cases, it is necessary to control the temperature with precision, and it is possible to this effect to recover fine particles from the fluidized bed drawn off through the chimney, and then, after having subjected them to cooling, to reintroduce them into the fluidized bed with a controlled flow rate, the excess of solid particles being removed through an orifice 13 placed at the base of the hopper 11 constituting the lower part of the tank 1. Such a method necessitates accurate control of the temperature of the solid material at the outlet 4 of the exchanger and it is particularly advantageous to use for this purpose a heat exchanger with a variable exchange coefficient, of the kind which has just been described. In fact, it is possible, for example, to place at the outlet 4 of the exchanger 1 a temperature sensor 8 which sends a signal representing the measured temperature to a regulation circuit 80 capable of actuating the valve 61 for regulating the flow rate of injected gas so as to determine the variation of the fluidization of level C, enabling the outlet temperature of the material to be kept constant even in the case of variation of the flow rate and/or of the temperature of the latter at the inlet into the exchanger.

In the application which has just been described, the exchanger with regulatable transfer coefficient according to the invention is used for the control of the temperature of the granular material, but it is obvious that the use of such an exchanger also permits the temperature of the heat transfer fluid flowing inside the exchange member to be controlled by varying the fluidization level. In the conventional case where the exchange member is constituted by parallel fluid circulating tubes, it is advantageous for the latter to be oriented vertically, as has been shown in the drawings, so as to distribute homogeneously the effect on the temperature of the fluid of the variation in the fluidization level.

We claim:

1. Method of regulating the heat transfer coefficient between a granular material and an exchange element of a heat exchanger comprising a tank with a vertical axis in which is arranged a descending flow of a charge of granular material in the form of a mobile bed, an elongated exchange element extending between lower and upper levels of said tank, and means for injecting beneath said charge and with adjustable flow a fluidization gas distributed homogeneously and forming an ascending current traversing said charge from bottom to top, said granular material being cooled from top to bottom by heat exchange with said exchange element, and said fluidization gas being heated by contact with said material, an increase in the temperature of said gas determining a continuous increase in the speed of its ascending flow, said method comprising the steps of (a) regulating the injection flow of said gas beneath said charge to a value such that the initial flow speed of said gas at the base of said exchanger is less than a critical speed at which said material is fluidized, said cricital speed being attained due to acceleration resulting from heating of said gas at an adjustable level which is located between said upper and lower levels of said exchange element, the latter thus covering two superposed zones of said charge of a height variable inversely to one another, namely a lower dense zone with a low exchange coefficient and an upper, fluidized zone with a high exchange coefficient; and (b) regulating the quantity of heat exchanged between said charge and said exchange element by varying said fluidization level through adjustment of the flow of injected gas.

2. Process according to claim 1, comprising the step of determining an increase in the speed of ascending flow of said gas by progressive narrowing of the cross section of a passage of said exchanger in an upward direction.

3. Process according to claim 1 or 2, applied to an exchanger for cooling a granular material, including the step of regulating the temperature of said material at an outlet from said exchanger by varying the fluidization level through adjustment of the flow of gas injected at the base of said exchanger.

4. Process according to claim 1 or 2, applied to the heating of a heat-carrying fluid flowing inside said exchange element, including the step of regulating the quantity of heat transferred to said heat-carrying fluid by varying the fluidization level through adjustment of the flow of gas injected at the base of said exchanger.

* * * * *